US011934890B2

(12) United States Patent
Zheng et al.

(10) Patent No.: US 11,934,890 B2
(45) Date of Patent: Mar. 19, 2024

(54) OPPORTUNISTIC EXCLUSIVE AFFINITY FOR THREADS IN A VIRTUALIZED COMPUTING SYSTEM

(71) Applicant: VMware, Inc., Palo Alto, CA (US)

(72) Inventors: Haoqiang Zheng, Palo Alto, CA (US); Xunjia Lu, Los Altos, CA (US)

(73) Assignee: VMware LLC, Palo Alto, CA (US)

( * ) Notice: Subject to any disclaimer, the term of this patent is extended or adjusted under 35 U.S.C. 154(b) by 430 days.

(21) Appl. No.: 17/378,381

(22) Filed: Jul. 16, 2021

(65) Prior Publication Data

US 2023/0015852 A1    Jan. 19, 2023

(51) Int. Cl.
*G06F 9/455* (2018.01)
*G06F 9/52* (2006.01)
*G06F 11/30* (2006.01)
*G06F 11/34* (2006.01)

(52) U.S. Cl.
CPC .......... *G06F 9/526* (2013.01); *G06F 9/45558* (2013.01); *G06F 11/3024* (2013.01); *G06F 11/3409* (2013.01); *G06F 2009/4557* (2013.01)

(58) Field of Classification Search
CPC .. G06F 9/526; G06F 9/45558; G06F 11/3024; G06F 11/3409; G06F 2009/4557
See application file for complete search history.

(56) References Cited

U.S. PATENT DOCUMENTS

2017/0103031 A1*    4/2017    Liu .................... G06F 13/22

* cited by examiner

*Primary Examiner* — Gregory A Kessler (74) *Attorney, Agent, or Firm* — Kim & Stewart LLP (57) ABSTRACT

An example method of managing exclusive affinity for threads executing in a virtualized computing system includes: determining, by an exclusive affinity monitor executing in a hypervisor of the virtualized computing system, a set of threads eligible for exclusive affinity; determining, by the exclusive affinity monitor, for each thread in the set of threads, impact on performance of the threads for granting each thread exclusive affinity; and granting, for each thread of the set of threads having an impact on performance of the threads less than a threshold, exclusive affinity to respective physical central processing units (PCPUs) of the virtualized computing system.

20 Claims, 4 Drawing Sheets

OPPORTUNISTIC EXCLUSIVE AFFINITY FOR THREADS IN A VIRTUALIZED COMPUTING SYSTEM

BACKGROUND

Computer virtualization is a technique that involves encapsulating a physical computing machine platform into virtual machine(s) executing under control of virtualization software on a hardware computing platform or "host." A virtual machine (VM) provides virtual hardware abstractions for processor, memory, storage, and the like to a guest operating system. The virtualization software, also referred to as a "hypervisor," incudes one or more virtual machine monitors (VMMs) to provide execution environment(s) for the virtual machine(s). As physical hosts have grown larger, with greater processor core counts and terabyte memory sizes, virtualization has become key to the economic utilization of available hardware.

Some applications have a few important threads that demand more central processing unit (CPU) cycles than other threads. Such threads are often the performance bottleneck of their respective applications. For example, threads on fast input/output (TO) paths in networking or storage stacks of a hypervisor or operating system can handle more than 100K IOs per second. In such case, the scheduling overhead related to frequent wait/wakeup calls and frequent context switches can be significant. It is desirable to provide a mechanism to automatically achieve a balance of the performance of high CPU-demand threads and overall system throughput.

SUMMARY

Opportunistic exclusive affinity for threads in a virtualized computing system is described. In an embodiment, a method of managing exclusive affinity for threads executing in a virtualized computing system includes: determining, by an exclusive affinity monitor executing in a hypervisor of the virtualized computing system, a set of threads eligible for exclusive affinity; determining, by the exclusive affinity monitor, for each thread in the set of threads, impact on performance of the threads for granting each thread exclusive affinity; and granting, for each thread of the set of threads having an impact on performance of the threads less than a threshold, exclusive affinity to respective physical central processing units (PCPUs) of the virtualized computing system.

Further embodiments include a non-transitory computer-readable storage medium comprising instructions that cause a computer system to carry out the above method, as well as a computer system configured to carry out the above method. Though certain aspects are described with respect to VMs, they may be similarly applicable to other suitable physical and/or virtual computing instances.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Opportunistic exclusive affinity for threads in a virtualized computing system is described. In embodiments, an exclusive affinity monitor provides a mechanism to automatically achieve a balance of the performance of CPU-demand threads and overall system throughput. It automatically selects a set of high-priority threads based on their CPU demand and CPU entitlement. It dynamically/opportunistically gives them exclusive access to their current running PCPUs if doing that will not affect the performance of other threads. The auto exclusive-affinity decisions can be adjusted over time (e.g., every few seconds) to be adaptive to the changing workload. These and further aspects are discussed below with respect to the drawings.

Figure 1:
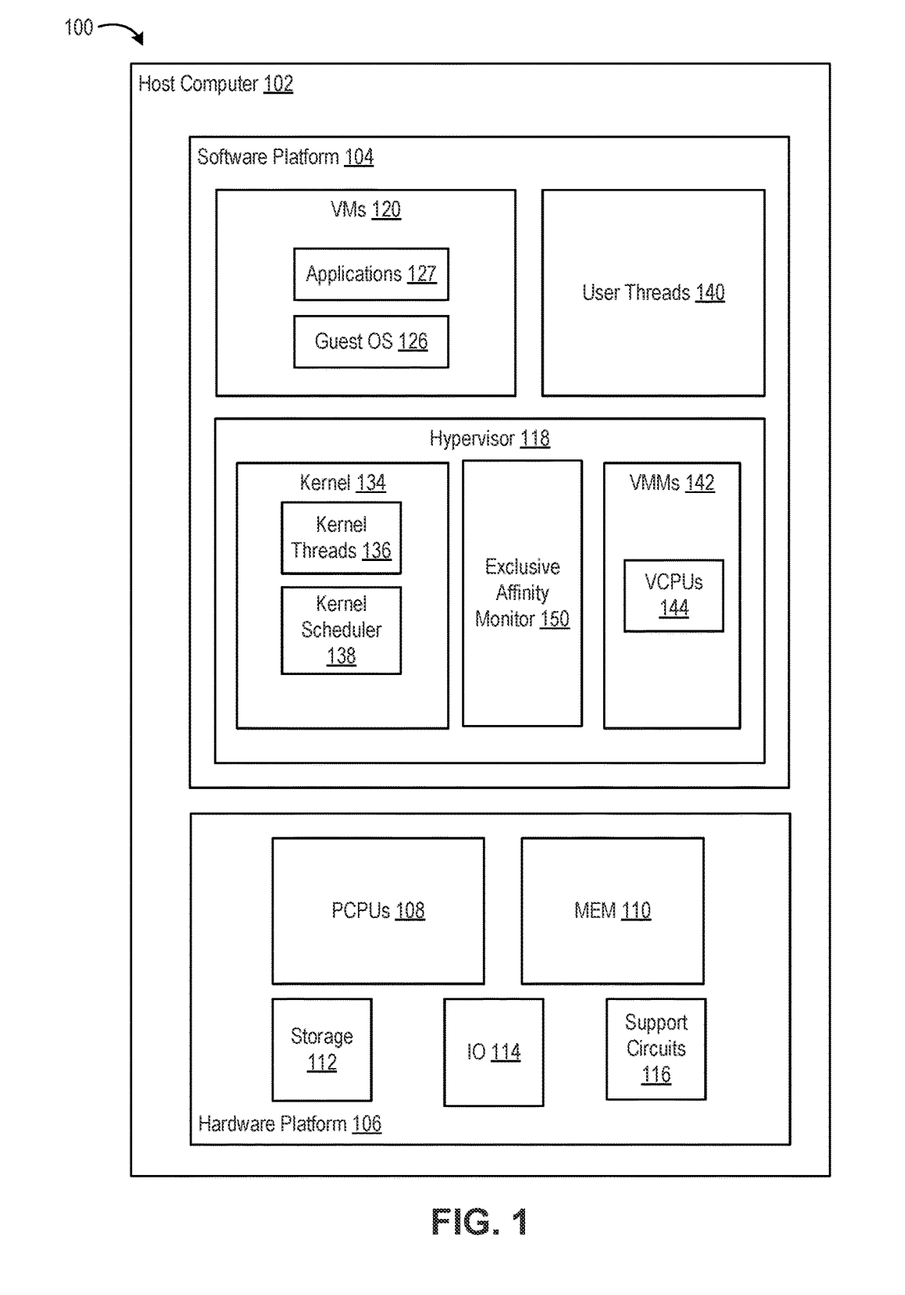
FIG. 1 is a block diagram depicting a virtualized computing system according to an embodiment.

FIG. 1 is a block diagram depicting a virtualized computing system 100 according to an embodiment. Virtualized computing system 100 includes a host computer 102 having a software platform 104 executing on a hardware platform 106. Hardware platform 106 may include conventional components of a computing device, such physical central processing units (PCPUs) 108, system memory (MEM) 110, a storage system (storage) 112, input/output devices (TO) 114, and various support circuits 116. PCPUs 108 are configured to execute instructions, for example, executable instructions that perform one or more operations described herein and may be stored in system memory 110 and storage system 112. PCPUs 108 can be individual CPUs and/or cores of CPU(s). Each PCPU 108 is a microprocessor, such as an x86 microprocessor.

System memory 110 is a device allowing information, such as executable instructions, virtual disks, configurations, and other data, to be stored and retrieved. System memory 110 may include, for example, one or more random access memory (RAM) modules. Storage system 112 includes local storage devices (e.g., one or more hard disks, flash memory modules, solid state disks, and optical disks) and/or a storage interface that enables host computer 102 to communicate with one or more network data storage systems. Examples of a storage interface are a host bus adapter (HBA) that couples host computer 102 to one or more storage arrays, such as a storage area network (SAN) or a network-attached storage (NAS), as well as other network data storage systems. Storage 112 in multiple hosts 102 can be aggregated and provisioned as part of shared storage accessible through a physical network (not shown). Input/output devices 114 include conventional interfaces known in the art, such as one or more network interfaces. Support circuits 116 include conventional cache, power supplies, clock circuits, data registers, and the like.

Software platform 104 includes a virtualization layer that abstracts processor, memory, storage, and networking resources of hardware platform 106 into one or more virtual machines ("VMs") that run concurrently on host computer 102. The VMs run on top of the virtualization layer, referred to herein as a hypervisor, which enables sharing of the hardware resources by the VMs. In the example shown, software platform 104 includes a hypervisor 118 that supports VMs 120. One example of hypervisor 118 that may be used in an embodiment described herein is a VMware ESXi™ hypervisor provided as part of the VMware vSphere® solution made commercially available from VMware, Inc. of Palo Alto, California (although it should be recognized that any other virtualization technologies, including Xen® and Microsoft Hyper-V® virtualization technologies may be utilized consistent with the teachings herein). Hypervisor 118 includes a kernel 134, an exclusive affinity monitor 150, and virtual machine monitors (VMMs) 142.

Hypervisor 118 can also support execution of user threads 140, which are part of software component(s) that execute independent of VMs 120. Examples of user threads 140 include utilities that perform various system-oriented functions, such as facilitating communication with kernel 134, providing directory services, and the like. User threads 140, like VMs 120, execute at a user-level, meaning that such software cannot perform certain privileged (kernel-level) functions.

Each VM 120 includes guest software (also referred to as guest code) that runs on the virtualized resources supported by hardware platform 106. In the example shown, the guest software of VM 120 includes a guest OS 126 and client applications 127. Guest OS 126 can be any commodity operating system known in the art (e.g., Linux®, Windows®, etc.). Client applications 127 can be any applications executing on guest OS 126 within VM 120.

Kernel 134 provides operating system functionality (e.g., process creation and control, file system, process threads, etc.), as well as PCPU scheduling and memory scheduling. Kernel 134 includes kernel threads 136 and a kernel scheduler 138. Kernel threads 136 are processes that perform operating system functions, such as memory and device management, and which execute in a privileged mode (as opposed to user threads 140, described earlier, which execute in a non-privileged mode).

VMMs 142 implement the virtual system support needed to coordinate operations between hypervisor 118 and VMs 120. Each VMM 142 manages a corresponding virtual hardware platform that includes emulated hardware, such as virtual CPUs (VCPUs) 144 and guest physical memory (also referred to as VM memory). Each virtual hardware platform supports the installation of guest software in a corresponding VM 120. A VM 120 accesses services provided by kernel 134 and/or hypervisor 118 through a particular VMM 142. Each VCPU 144 appears to be a physical CPU from the standpoint of applications 127 and guest OS 126 that run in a corresponding VM 120. In this way, a virtualized guest operating system that runs within a virtual machine may schedule and dispatch processes for execution on one or more VCPUs in the same way that an operating system that runs directly on a computer host (i.e., in a non-virtualized manner) schedules and dispatches processes for execution on physical CPUs. However, from the standpoint of hypervisor 118 (which, in embodiments, executes directly on hardware platform 106), each VCPU 144 is a process to be scheduled and dispatched on PCPU 108 of host computer 102.

Kernel scheduler 138 is responsible for scheduling tasks for execution on PCPUs 108. It should be noted that all tasks that execute on host computer 102 must share its underlying hardware platform 106. This includes random access memory, external storage, and processing time on PCPUs 108. Thus, the tasks that kernel scheduler 138 schedules for processing include VCPUs 144 (which are the virtual CPUs of executing VMs), user threads 140, and kernel threads 136. In embodiments, kernel scheduler 138 maintains a separate run queue for each PCPU (not shown). That is, kernel scheduler 138 schedules a thread for execution on a particular PCPU 108 by placing that process in the run queue for that particular PCPU 108. Typically, a PCPU 108 only executes processes from its own queue for execution thereon. However, it is possible for one PCPU 108 to become idle while other PCPUs 108 have jobs waiting in their run corresponding run queues. Thus, periodically, kernel scheduler 138 rebalances the queues. That is, if the run queue of a particular PCPU 108 is long, kernel scheduler 138 moves some of the tasks therein to run queues of PCPUs that are less busy.

Exclusive affinity monitor 150 can execute as one or more threads, such as one or more kernel threads 136. Exclusive affinity monitor is configured to monitor threads (e.g., kernel threads 136, user threads 140, VCPUs 144) and grant or remove exclusive affinity to PCPUs 108 for such threads. When a thread has exclusive affinity to a PCPU 108, the PCPU is, effectively, dedicated to running that particular thread. That is, kernel scheduler 138 will refrain from scheduling any processes for execution on the PCPU to which a thread has exclusive affinity, even in cases where the PCPU is in an idle state. Further, kernel scheduler 138 will refrain from scheduling most interrupt processing on the PCPU. Instead, interrupt processing is scheduled and dispatched on other PCPUs, provided no threads have exclusive affinity to such other PCPUs. When a thread is executing in exclusive-affinity mode, the migration and context switching code for the PCPU is skipped (since there is only one thread executing on the PCPU). This reduces scheduling overhead and latency of the thread in exclusive-affinity mode.

Running a thread in exclusive-affinity mode does come with a side effect: the PCPU the thread is running on can no longer by used by other threads. When the system is loaded, this can affect the overall system throughput. However, when the system load is low, given exclusive affinity to a small set of high-priority threads may not impact the performance of other threads.

In embodiments, exclusive affinity monitor 150 provides a mechanism to automatically achieve a balance of the performance of CPU-demand threads and overall system throughput. It automatically selects a set of high-priority threads based on their CPU demand and CPU entitlement. It dynamically/opportunistically gives them exclusive access to their current running PCPUs if doing that will not affect the performance of other threads. The auto exclusive-affinity decisions can be adjusted over time (e.g., every few seconds) to be adaptive to the changing workload.

While running a thread in exclusive-affinity mode can reduce the overhead/latency of this world, it comes at a side effect that unused cycles of the PCPU can no longer be used by other threads. As such, exclusive affinity monitor 150 should be selective in deciding which threads should be given exclusive affinity. There are some constraints that should be considered:

1. Fairness: scheduling of a thread with exclusive affinity should not violate the system's fairness policy. A thread with exclusive affinity will occupy the whole PCPU. So its effective entitlement should be at least one PCPU. The effective entitlement of the thread can be computed with the assumption that the thread's CPU demand is 100 percent.

2. Minimize the impact on other worlds: workloads can be bursty. So even when the system load is low, it still helps to have extra PCPUs to handle the bursty workloads. A PCPU in exclusive affinity mode is not available to handle bursty workloads. Thus, exclusive affinity monitor 150 ensures that after these cores are taken out for auto-exclusive affinity, there are still enough PCPUs left for the rest workloads.
3. Compatibility with the existing low-latency features: exclusive affinity monitor 150 ensures that the auto-exclusive feature described herein does not affect other low-latency features that may be present, such as that described in U.S. Pat. No. 9,262,198, which is incorporated by reference herein. Whenever a new low-latency VM is powered on, exclusive affinity monitor 150 unsets all the worlds with auto-affinity. Exclusive affinity monitor 150 can resume the auto-affinity after the pending low-latency VM is properly placed.
4. CPU affinity enforcement: whenever a thread's affinity is changed by the user, exclusive affinity monitor 150 unsets the auto-affinity and reapplies after the thread is moved to the PCPU that is compatible with the new affinity.
5. Impact on the kernel scheduler: kernel scheduler 138 tries to move communicating threads close to each other to reduce inter-thread communication cost. By default, a thread with exclusive affinity set cannot be rebalanced. In embodiments, kernel scheduler 138 is configured to ignore the auto-set exclusive affinity so that the threads with auto-set exclusive-affinity can still be rebalanced by kernel scheduler 138.
6. Minimize the waste: since hardware platform has a limited number of PCPUs 108, the preference should be given with high priority system threads with higher demand. A thread with high demand will "waste" less CPU cycles than a thread with low demand.
7. Co-run requirement: if the host has large VMs with a lot of vCPUs, exclusive affinity monitor 150 ensures the auto-exclusive affinity feature does not prevent the vCPUs in the VM from co-running in parallel.

Figure 2:
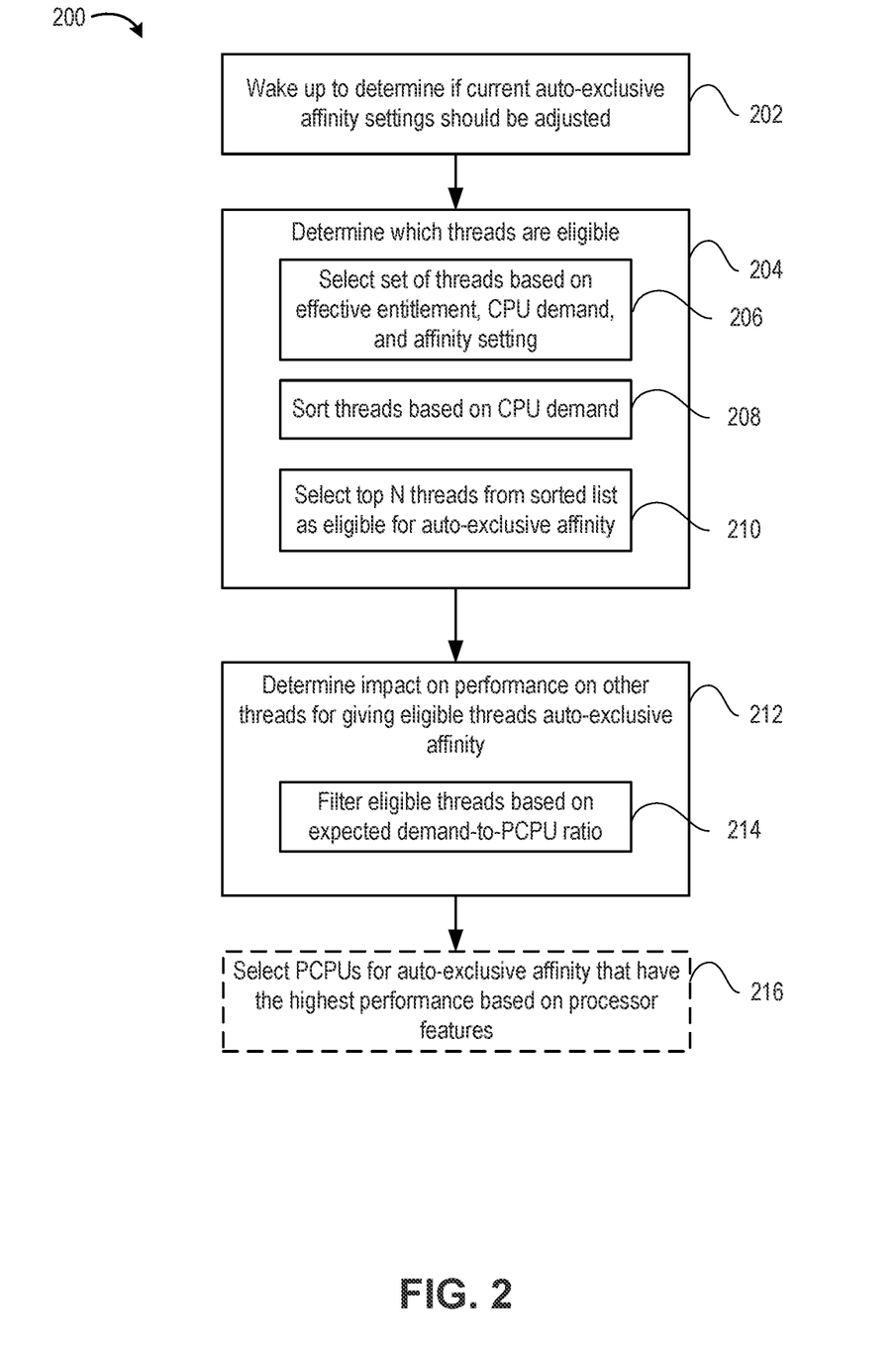
FIG. 2 is a flow diagram depicting a method of managing auto-exclusive affinity for threads according to an embodiment.

FIG. 2 is a flow diagram depicting a method 200 of managing auto-exclusive affinity for threads according to an embodiment. Method 200 can be performed by exclusive affinity monitor 150. Method 200 begins at step 202, where exclusive affinity monitor 150 wakes up to determine if the current auto-exclusive affinity settings should be adjusted. For example, exclusive affinity monitor can wake up every predefined number of seconds.

At step 204, exclusive affinity monitor 150 determines which threads are eligible for auto-exclusive affinity. At step 206, exclusive affinity monitor 150 selects a set of threads based on effective entitlement, CPU demand, and current affinity setting. The effective entitlement for a thread may be determined specifying a CPU reservation value, a CPU limit value, and a CPU shares value. A CPU reservation value represents a guaranteed minimum allocation of CPU resources for the thread. By contrast, a CPU limit value represents a maximum allocation of CPU resources for the thread. Finally, a CPU shares value represents an amount of CPU resources that a thread is allocated relative to an amount of CPU resources allocated to other threads. Thus, with a CPU shares allocation, the CPU entitlement for a thread may change dynamically as other threads start, stop, or have their own CPU shares values configured. In an embodiment, the effective entitlement value is a percentage. In this embodiment, the entitlement value represents a reserved percentage of CPU resources for the thread. That is, the reservation represented by an effective entitlement value specifies a guaranteed minimum allocation for the corresponding thread. CPU demand is computed based on the thread's run/sleep pattern. In addition, the affinity of a thread is always respected. For example, if a thread has affinity to PCPU 3, the thread will never be scheduled on any PCPU other than PCPU 3.

Figure 3:
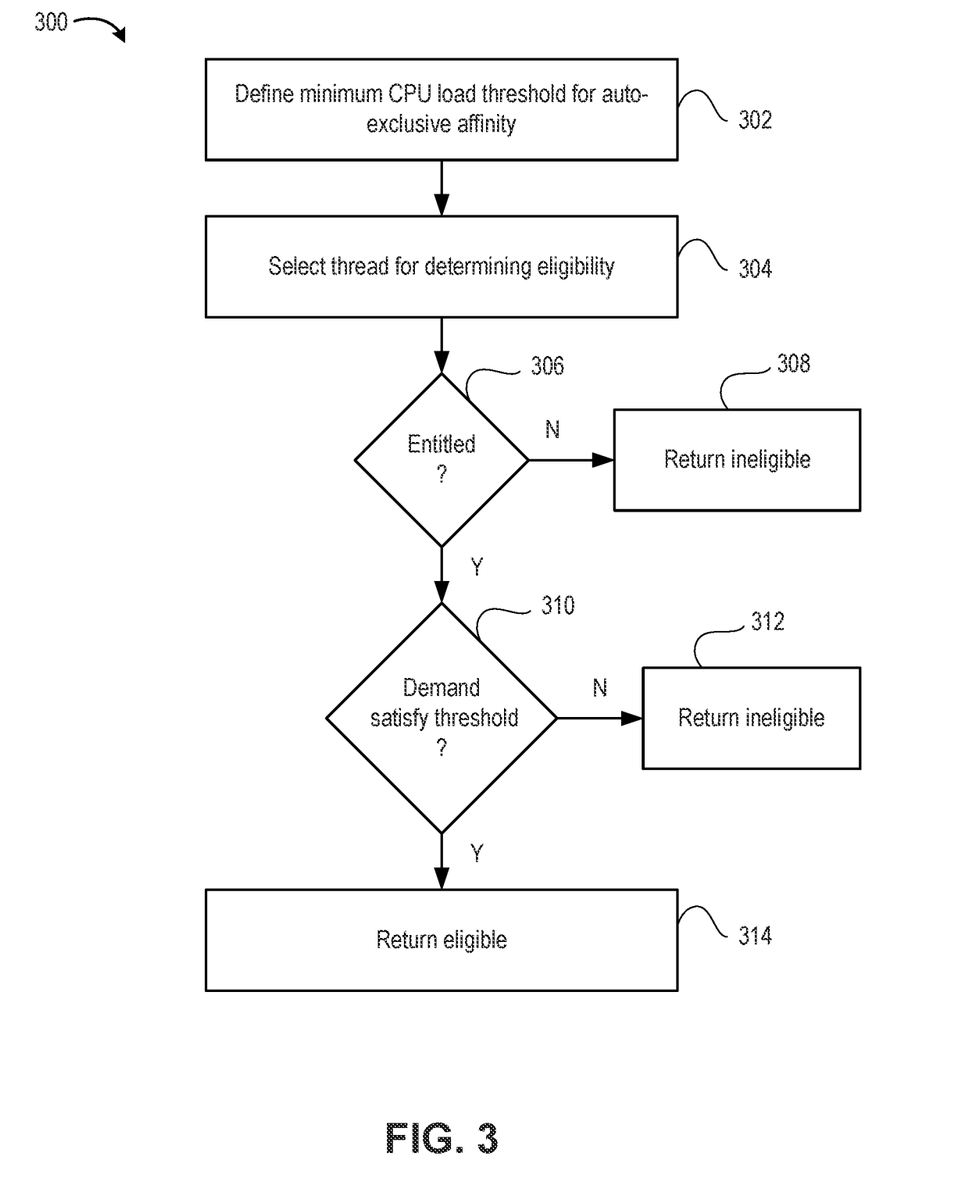
FIG. 3 is a flow diagram depicting a method of determining exclusive affinity eligibility for threads according to an embodiment.

FIG. 3 is a flow diagram depicting a method 300 of determining exclusive affinity eligibility for threads according to an embodiment. Method 300 begins at step 302, where exclusive affinity monitor 150 defines a minimum CPU load threshold for auto-exclusive affinity. At step 304, exclusive affinity monitor 150 selects a thread for testing eligibility. At step 306, exclusive affinity monitor 150 determines whether the thread is entitled to execute on a PCPU. Effective entitlement for a thread is determined as described above. In embodiments, to be eligible for exclusive affinity, a thread effective entitlement must be greater than or equal to 100% of a PCPU. If not, method 300 proceeds to step 308 where the thread is marked ineligible. Otherwise, method 300 proceeds to step 310. At step 310, exclusive affinity monitor 150 determines whether the thread satisfies the CPU demand threshold. Exclusive affinity monitor 150 can predict the load a thread put on a PCPU during its execution. The load on a PCPU is the sum of the CPU demand of all threads placed on this PCPU. Exclusive affinity monitor 150 can add the load of the thread to the current load. If the thread does not satisfy the CPU demand threshold, the thread is marked ineligible at step 312. Otherwise, method 300 proceeds to step 314 and marks the thread as eligible for exclusive affinity. Steps 304-314 can be repeated for each thread being considered to exclusive affinity.

Returning to FIG. 2, at step 208, exclusive affinity monitor 150 sorts the set of threads based on CPU demand (e.g., highest demand to lowest demand). At step 210, exclusive affinity monitor 150 selects the top N threads from the sorted list as eligible for auto-exclusive affinity (where N is a configurable number of threads).

At step 212, exclusive affinity monitor 150 determines impact on performance on other threads for giving eligible threads auto-exclusive affinity. At step 214, exclusive affinity monitor 150 filters eligible threads based on expected demand-to-PCPU ratio.

Figure 4:
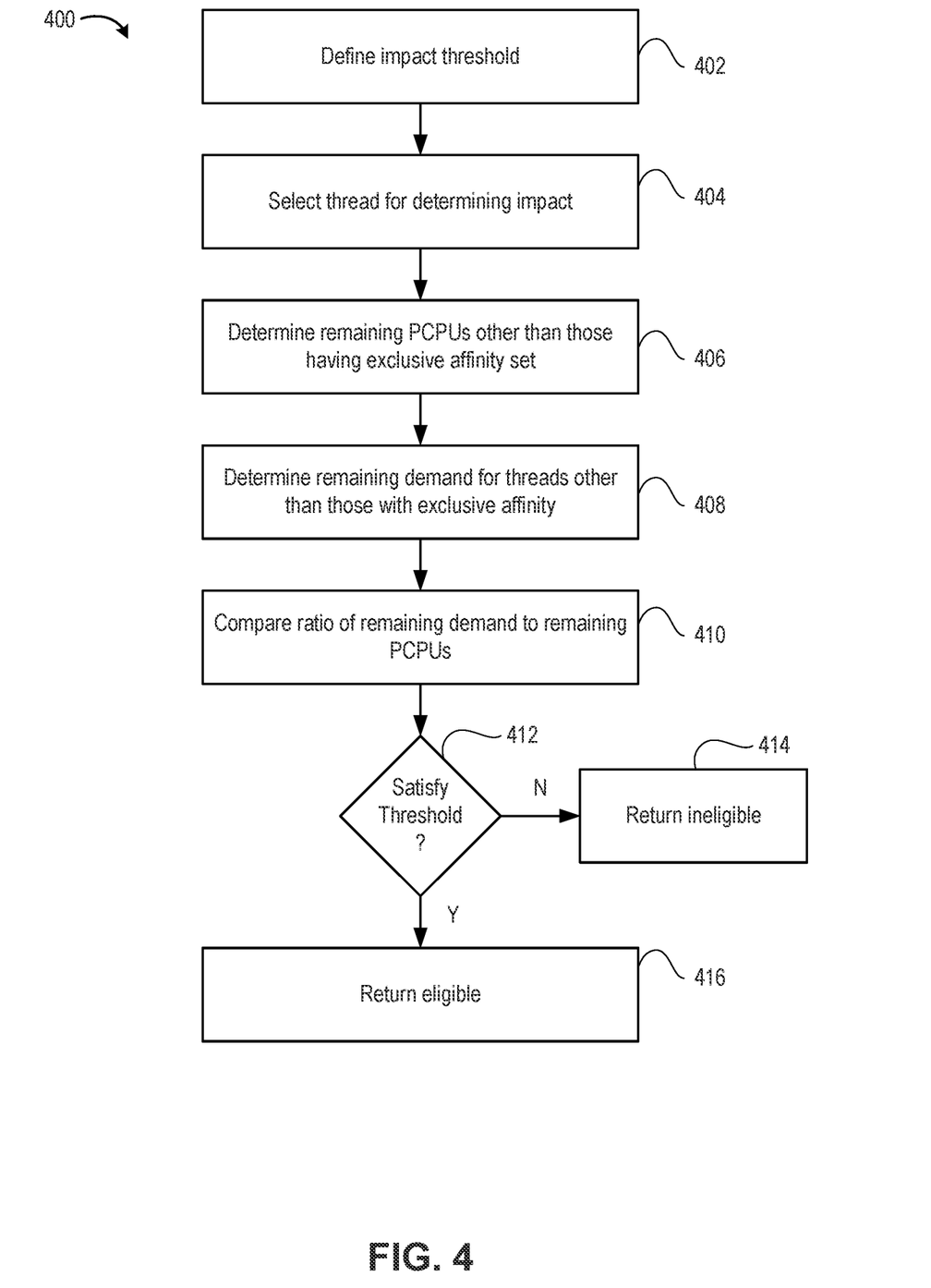
FIG. 4 is a flow diagram depicting a method of determining the impact on performance on other threads when considering a thread for exclusive affinity according to an embodiment.

FIG. 4 is a flow diagram depicting a method 400 of determining the impact on performance on other threads when considering a thread for exclusive affinity according to an embodiment. Method 400 begins at step 402, where exclusive affinity monitor 150 defines an impact threshold. At step 404, exclusive affinity monitor 150 selects a thread for determining impact if given exclusive affinity. At step 406, exclusive affinity monitor 150 determines the remaining number of PCPUs other than those executing threads with exclusive affinity. At step 408, exclusive affinity monitor 150 determines the remaining demand for threads other than those having exclusive affinity set. At step 410, exclusive affinity monitor 150 compares the ratio of remaining demand to the remaining PCPUs. At step 412, exclusive affinity monitor 150 determines if the ratio satisfies the impact threshold. If not, method 400 proceeds to step 414 where the thread is marked ineligible for exclusive affinity. Otherwise, method 400 proceeds to step 416 where the thread is marked eligible for exclusive affinity.

When selecting the PCPUs, exclusive affinity monitor 150 can select the PCPUs that have the highest performance (e.g., as defined by Intel's Turbo Boost Max Technology for an x86 processor). Exclusive affinity monitor can also take advantage of Intel Speed Select Technology (SST). The feature allows to specify a high frequency for the PCPUs with exclusive affinity. Processors from other manufacturers may have similar technologies and features for identifying high performance and/or high frequency. At step 216, exclusive affinity monitor 150 selects PCPUs that have the highest performance based on processor features for executing auto-exclusive affinity threads.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of managing exclusive affinity for threads executing in a virtualized computing system, the method comprising:
   determining, by an exclusive affinity monitor executing in a hypervisor of the virtualized computing system, a set of threads eligible for exclusive affinity;

determining, by the exclusive affinity monitor, for each thread in the set of threads, impact on performance of the threads for granting each thread exclusive affinity; and granting, for each thread of the set of threads having an impact on performance of the threads less than a threshold, exclusive affinity to respective physical central processing units (PCPUs) of the virtualized computing system.

2. The method of claim 1, wherein the step of determining the set of threads eligible for exclusive affinity comprises:

selecting a plurality of the threads based on effective entitlement and central processing unit (CPU) demand;

sorting the plurality of threads based on CPU demand; and selecting a portion of the plurality of threads having the highest CPU demand as the set of threads eligible for exclusive affinity.

3. The method of claim 1, wherein the step of determining impact on performance of each thread in the set of threads comprises:

filtering the set of threads based on expected demand-to-PCPU ratio.

4. The method of claim 3, wherein the step of filtering comprises, for each thread in the set of threads:

determining available PCPUs by removing those of the PCPUs having threads in exclusive affinity mode;

determining remaining demand of the threads by removing those of the threads in exclusive affinity mode; and removing the respective thread from the set of threads if the ratio of remaining demand to available PCPUs is greater than a threshold.

5. The method of claim 1, further comprising:

selecting the PCPUs that have highest performance based on features of a processor in the virtualized computing system that identify at least one of high performance or high frequency.

6. The method of claim 1, wherein the threads include at least one of user threads executing on the hypervisor, kernel threads executing on the hypervisor, or virtual CPUs executing on the hypervisor.

7. The method of claim 6, wherein the virtual CPUs are allocated to at least one virtual machine supported by the hypervisor.

8. A non-transitory computer readable medium having instructions stored thereon that when executed by a processor cause the processor to perform a method of managing exclusive affinity for threads executing in a virtualized computing system, the method comprising:

determining, by an exclusive affinity monitor executing in a hypervisor of the virtualized computing system, a set of threads eligible for exclusive affinity;

determining, by the exclusive affinity monitor, for each thread in the set of threads, impact on performance of the threads for granting each thread exclusive affinity; and granting, for each thread of the set of threads having an impact on performance of the threads less than a threshold, exclusive affinity to respective physical central processing units (PCPUs) of the virtualized computing system.

9. The non-transitory computer readable medium of claim 8, wherein the step of determining the set of threads eligible for exclusive affinity comprises:

selecting a plurality of the threads based on effective entitlement and central processing unit (CPU) demand;

sorting the plurality of threads based on CPU demand; and selecting a portion of the plurality of threads having the highest CPU demand as the set of threads eligible for exclusive affinity.

10. The non-transitory computer readable medium of claim 8, wherein the step of determining impact on performance of each thread in the set of threads comprises:

filtering the set of threads based on expected demand-to-PCPU ratio.

11. The non-transitory computer readable medium of claim 10, wherein the step of filtering comprises, for each thread in the set of threads:

determining available PCPUs by removing those of the PCPUs having threads in exclusive affinity mode;

determining remaining demand of the threads by removing those of the threads in exclusive affinity mode; and removing the respective thread from the set of threads if the ratio of remaining demand to available PCPUs is greater than a threshold.

12. The non-transitory computer readable medium of claim 8, further comprising:

selecting the PCPUs that have highest performance based on features of a processor in the virtualized computing system that identify at least one of high performance or high frequency.

13. The non-transitory computer readable medium of claim 8, wherein the threads include at least one of user threads executing on the hypervisor, kernel threads executing on the hypervisor, or virtual CPUs executing on the hypervisor.

14. The non-transitory computer readable medium of claim 13, wherein the virtual CPUs are allocated to at least one virtual machine supported by the hypervisor.

15. A virtualized computing system, comprising:

a hardware platform having a plurality of physical central processing units (PCPUs); and a hypervisor executing on the hardware platform, the hypervisor having an exclusive affinity monitor configured to managing exclusive affinity for threads by:

determining a set of threads eligible for exclusive affinity;

determining, for each thread in the set of threads, impact on performance of the threads for granting each thread exclusive affinity; and granting, for each thread of the set of threads having an impact on performance of the threads less than a threshold, exclusive affinity to respective ones of the plurality of PCPUs.

16. The virtualized computing system of claim 15, wherein determining the set of threads eligible for exclusive affinity comprises:

selecting a plurality of the threads based on effective entitlement and central processing unit (CPU) demand;

sorting the plurality of threads based on CPU demand; and selecting a portion of the plurality of threads having the highest CPU demand as the set of threads eligible for exclusive affinity.

17. The virtualized computing system of claim 15, wherein determining impact on performance of each thread in the set of threads comprises:

filtering the set of threads based on expected demand-to-PCPU ratio.

18. The virtualized computing system of claim 17, wherein the filtering comprises, for each thread in the set of threads:

determining available PCPUs by removing those of the PCPUs having threads in exclusive affinity mode;

determining remaining demand of the threads by removing those of the threads in exclusive affinity mode; and removing the respective thread from the set of threads if the ratio of remaining demand to available PCPUs is greater than a threshold.

19. The virtualized computing system of claim 15, wherein the exclusive affinity monitor is further configured to:

select the respective ones of the plurality of PCPUs that have highest performance based on features of a processor in the virtualized computing system that identify at least one of high performance or high frequency.

20. The virtualized computing system of claim 15, wherein the threads include at least one of user threads executing on the hypervisor, kernel threads executing on the hypervisor, or virtual CPUs executing on the hypervisor.

* * * * *